(12) United States Patent
Tamura et al.

(10) Patent No.: US 7,836,825 B2
(45) Date of Patent: Nov. 23, 2010

(54) METHOD FOR CONTROLLING LUMINANCE OF TRANSMISSIVE BOARD AND TRANSMISSIVE BOARD

(75) Inventors: Yoshihiko Tamura, Tokyo-to (JP); Kenichi Aso, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 240 days.

(21) Appl. No.: 11/547,064

(22) PCT Filed: Mar. 31, 2005

(86) PCT No.: PCT/JP2005/006276
§ 371 (c)(1),
(2), (4) Date: Sep. 28, 2006

(87) PCT Pub. No.: WO2005/095899
PCT Pub. Date: Oct. 13, 2005

(65) Prior Publication Data
US 2008/0271632 A1 Nov. 6, 2008

(30) Foreign Application Priority Data
Mar. 31, 2004 (JP) .............................. 2004-104657

(51) Int. Cl.
*B41F 33/00* (2006.01)
*G01D 11/28* (2006.01)

(52) U.S. Cl. ........................................ 101/483; 362/23

(58) Field of Classification Search ................. 101/483; 358/1.9; 362/23–30
See application file for complete search history.

(56) References Cited

U.S. PATENT DOCUMENTS 4,536,218 A * 8/1985 Ganho ........................ 524/270
5,790,150 A * 8/1998 Lidke et al. .................... 347/41
2004/0223173 A1* 11/2004 Arai ............................ 358/1.9
2006/0268085 A1* 11/2006 Konno ......................... 347/100
2007/0076406 A1* 4/2007 Kodama et al. ................ 362/97
2008/0130942 A1* 6/2008 Kitani ......................... 382/100

FOREIGN PATENT DOCUMENTS

| JP | 60-122947 | | 7/1985 |
|---|---|---|---|
| JP | 63-061117 | | 3/1988 |
| JP | 6-25679 | | 4/1994 |
| JP | 7-318376 | | 12/1995 |
| JP | 2001-153692 | | 6/2001 |
| JP | 2001153692 A | * | 6/2001 |
| JP | 2002-98558 | | 4/2002 |
| JP | 2002098558 A | * | 4/2002 |

* cited by examiner

*Primary Examiner*—Ren Yan
*Assistant Examiner*—David Banh
(74) *Attorney, Agent, or Firm*—Ladas & Parry LLP

(57) ABSTRACT

A method of controlling the luminance of a transmissive board at the moment of transmissive illumination by providing the steps of determining a criterion number of ink transfers by roughly controlling the luminance of the highest luminance at the moment of transmissive illumination to closely reflect the lowest transmissive luminance on the board, determining the criterion area-ratio by the minor control of the luminance on the board so that the higher luminance most closely reflects the luminance of the lowest luminance on the board, and equalizing the luminance of all luminance on the board so that all luminance is controlled to be the lowest luminance of the transmissive board at the time of transmissive illumination by a light source by the transfer of ink according to a prepared processing number. Also provided is the transmissive board wherein the transmissive luminance is controlled by the method of the invention.

1 Claim, 8 Drawing Sheets

METHOD FOR CONTROLLING LUMINANCE OF TRANSMISSIVE BOARD AND TRANSMISSIVE BOARD

TECHNICAL FIELD

The present invention relates to a method for controlling luminance of transmissive board and a transmissive board the luminance of which is controlled.

BACKGROUND ART

The luminances of a transmissive board such as an instrument board for a vehicle sometimes varies depending on the position of a light source or the distance from the light source. As a method of equalizing the luminance, the following method has been already known (see the patent document 1 and the patent document 2). The method includes the step of photographing the front side of the transmissive board at the moment of transmissive illumination, then the image data of the board is converted to electric signals, the step of implementing the dots disassembly based on the information of the electric signals to make an original plate for printing, and the step of providing dots to a transmissive board based on the original plate for printing.

Patent Document 1: Japanese Patent Laid-Open No. 60122947

Patent Document 2: Japanese Patent Laid-Open No. 6361117

DISCLOSURE OF THE INVENTION

Problem to be Solved by the Invention

However, as a screen printing is applied to the above mentioned method, an original plate for printing and a printing plate are required. That causes a lot of steps and high costs. Moreover, in the screen printing, the minimum dot-diameter of dot depends on the size of an opening of silk gauze used for the printing plate. Therefore, for controlling the luminance, such a tangled work, so-called ink toning, is needed, that the following steps are repeated several times trough a trial and error process: printing on the board using inks having different transmittance from each other, illuminating and photographing the printed board, and checking the state of the luminance. Accordingly, a great deal of time and workload are needed.

Therefore, the aim of the present invention is to provide a method for controlling the luminance of a transmissive board at the moment of transmissive illumination in a short time and at a low cost, and also to provide a transmissive board the luminance of which is controlled by the method.

Means for Solving the Problem

The method of controlling luminance of the present invention involves rough and minor control steps that control the luminance of a control object relative to a target luminance on a transmissive board at a moment of transmissive illumination. Also provided is a method for equalizing the luminance of the control object to that of the target luminance. The method comprises the steps of: roughly controlling a printing ink on a front side or a back side of a part wherein the printing ink has a constant light transmittance by determining the maximum number of times to transfer ink within such a range that the brightest luminance (control object) is controlled by reducing the luminance of the control object to, but not exceeding the minimum or target luminance at the moment of transmissive illumination; and minor controlling the printing ink on the front side or the back side of the part by determining the amount of the ink to be printed to a unit area in accordance with a luminance difference between the target luminance and the luminance of the control object which is not eliminated in the roughly controlling step, and equalizing the luminance of the board to finally transfer the appropriate amount of ink to the board thereby solving the above problems.

In other words, as the ink, having a constant light transmittance, is printed on the part corresponding to the luminance of the control object according to the roughly controlling step, the light transmittance of the part can be decreased according to the number of times the ink is transferred by a predetermined ratio. Therefore, in the roughly controlling step, the luminance of the control object can be made as close to the target luminance as possible. For a small range of luminance which can not be controlled by printing the ink as it is, the luminance can be controlled by controlling amount of the ink to be printed to a particular unit area according to the minor controlling step. Finally, the luminance of the control object can be equalized to the target luminance.

Therefore, the print type of the present invention is enough to control the print area of ink to a unit area, and requires neither an original plate for printing nor a printing plate. Accordingly, the luminance control of the transmissive board can be implemented precisely and quickly. As the state of printing the ink on the front side or the back side of the transmissive board, the case where the ink is printed on the transmissive board directly and the case where the ink is printed on a construction mounted on the front side or the back side of the transmissive board are included. The order of implementing the rough control step and the minor control step does not matter.

In the method of the present invention, a lowest luminance may be set as the target luminance, and all of the other luminances may be set as the control object luminance. The luminance of the control object is controlled to most closely reflect the low luminance of the target luminance. Thereby, all luminances of the transmissive board at the moment of transmissive illumination are equalized to the lowest luminance, and a transmissive board without variant luminance can be obtained.

The method for equalizing the luminance of a transmissive board in which a luminance of a transmissive board at a moment of transmissive illumination is controlled equally by printing ink, having a constant light transmittance on a front side or a back side of the transmissive board, plural times is also provided herein.

According to one embodiment of the present invention, first, the maximum ink amount that is necessary to bring the most transmissive, or most luminescent portion (a control object) to the low transmissive level of the least transmissive portion of the board (the target luminance) is obtained. The maximum ink amount is the amount of ink which is required to eliminate the luminance difference between the highest luminance (control object) and the lowest luminance (target luminance) of the transmissive board. Consider that each transfer of ink is considered 1 round of printing. In one example, therefore, consider that the maximum amount of ink that would reduce the transmittance of the control object to close to that of the target luminance may be 3 full transfers of ink (during the rough control step) and an additional 0.2 of the ink is necessary for the control luminance to most closely resemble the target luminance (during the minor control step). In such a situation, where the maximum ink amount required to accomplish bringing the luminance of the control object down to that of the target luminance is 3.2. What this means is that three times of printing the entire or whole volume of ink as it is and one time of printing the ink with the ink amount of 0.2 (or 20% the entire volume of ink), in the case where a normal amount of ink is set to 1, would mean that there will be four (4) transfers of ink; three transfers of an entire volume of ink and one transfer of a 20% (0.2) volume of an entire volume of ink.

As there is no luminance part higher than the highest luminance, when the highest luminance is equaled to the lowest luminance, it means that all luminances of the transmissive board are equalized to the lowest luminance.

The terms including the method of controlling the luminance of transmissive board by printing the ink, the type of printing of the present invention, and the term "print the ink on the front side and the back side of the transmissive board" all relate to the method of the above summarized invention. Also, by the present invention is provided a transmissive board in which luminance has been controlled by the method for controlling luminance as described in this invention.

Effect of the Invention

As described above, according to the present invention, by printing to laminate the ink having a constant light transmittance and printing the ink with controlled amount of ink to be printed to a unit area, the method for controlling in a short time at a low cost the luminance of a transmissive board at the moment of transmissive illumination can be provided, and a transmissive board with controlled luminance at the moment of transmissive illumination controlled by the method for controlling luminance can also be provided.

BEST MODE FOR CARRYING OUT THE INVENTION

Figure 1:
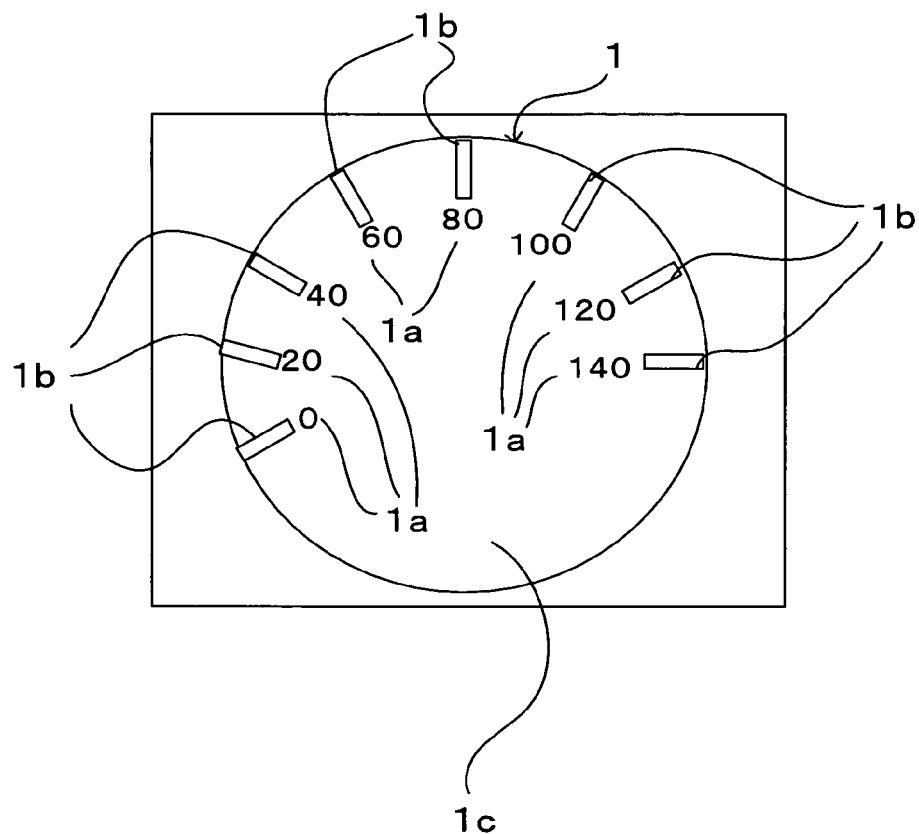
FIG. 1 is a view of an example of the transmissive board of the present invention.

FIG. 1 is a view showing an example of a transmissive board for realizing the present invention. As showed in FIG. 1, the transmissive board of the present embodiment is a speed meter 1 for a vehicle. The speed meter 1 has a display area 1c including a numeric area 1a indicating speed and a level-bar area 1b. As the numeric area 1a and the level-bar are 1b should be illuminated, shading typed base material (no figures) where shading typed ink is printed on the back side of the display area 1c to shade the area except for the numeric area 1a and the level-bar area 1b. Thereby, when the speed meter 1 is illuminated on the back side thereof by a plural of point light sources (no figures), the area except for the area shaded by the shading typed base material is transmissively illuminated. As the result of that, the numeric area 1a and level-bar area 1b are illuminated. These areas are referred to as transmissively illuminated areas (TIA).

Figure 2:
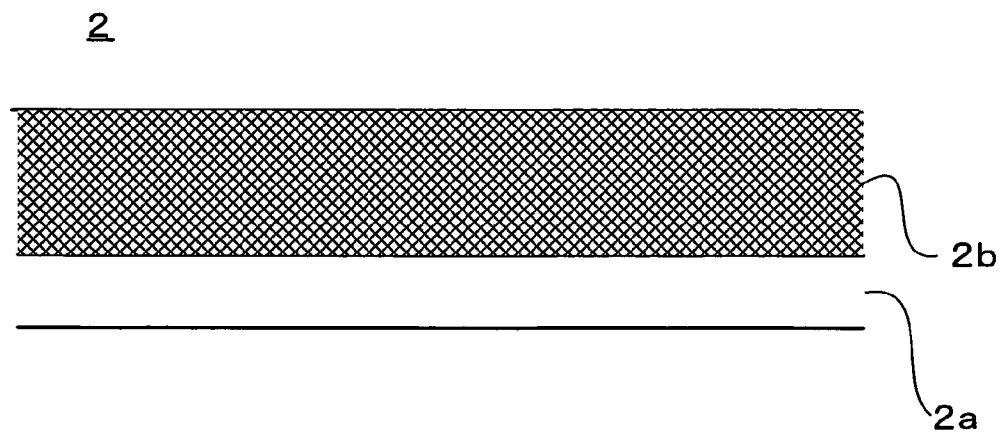
FIG. 2 is a cross-section diagram of a thermal-transfer ink sheet for controlling luminance used in the present embody.

In all of the areas 1a, 1b to be transmissively illuminated, the position relationship with the plurality of point light sources is not equal. Therefore, if the transmittance is equal between areas, the luminance of each area is different from each other. The present invention is used for solving the luminance variance like this. In the present embodiment, the lowest luminance is referred to as the "target luminance" and other luminances are the luminance that are to be controlled and eventually lowered to the target luminance but are referred to as "control object". In the present embodiment, a thermal transferring method is applied as a printing method, and a thermal-transfer ink sheet 2 for controlling luminance shown in FIG. 2 is engaged for printing ink. The thermal-transfer ink sheet 2 for controlling luminance shown in FIG. 2 has a base material layer 2a and an ink layer 2b. The ink layer 2b has a predetermined transmittance to decrease light volume of transmitted light, and is transferred to a control object on the shading typed base material to reduce the luminance of that control object. Luminance can also be thought of as transmissiveness.

When the ink layer 2b is transferred to the shading typed base material, the volume of light transmitting through the TIA decreases according to the volume of ink transferred. Accordingly, as a result, the luminance of the transferred portion is controlled lower. In the rough control step of the method of the invention, when the ink layer 2b is transferred as it is without controlling the ink volume (later described), the luminance is controlled always by a same ink volume for each transfer. The ink volume to be controlled is constant for one transfer, because the transmittance of the ink layer 2b is constant. In the rough control step, the amount of light or transmittance of light to be controlled is the highest luminance range which can be controlled by transferring the ink layer 2b. Hereinafter the ink volume to be controlled is referred as "the highest ink volume control". Additionally, if the ink is transferred plural times, the ink volume to be controlled increases in accordance with the number of times the ink is transferred.

The minor control step, as aforementioned, is provided to control the luminance of the control object at a particular unit area to more closely resemble the luminance of the target luminance. In the case where the volume of ink layer $2b$ is 1 at the moment when the ink layer $2b$ is transferred to the unit area as it is, a volume of ink layer $2b$ to be transferred by the rough control step is 1 whole ink transfer for as many times as is necessary to bring the luminance of the control object closer to that of the target luminance (referred to as the maximum ink volume control). The volume of ink layer $2b$ to be transferred to the unit area in the minor control step is called an area-ratio. The minor control step provides a further reduction of the luminance of the control object to closer to that of the target luminance. In this example, in order to transfer the ink layer $2b$ according to the area-ratio in the minor control step, the volume of ink layer $2b$ transferred is controlled by controlling the number of dots of the ink layer $2b$ to be transferred. Hereinafter, the ink volume to be controlled by the minor control step is referred as "the minor ink volume". As can be seen, therefore, if the ink volume is transferred to the shading typed base material as a whole or an entire transfer, then that is referred to as a "transfer" and if the ink is transferred according to the minor control step and the area-ratio wherein a portion of the whole transfer is accomplished, then the transfer is referred to as a "minor-control transfer".

Turning to the Figures, the method of controlling and equalizing the board is provided. The "criterion number" of transferred layers is the number of whole transfers of ink that are necessary to bring the highest luminance area of the transmissive board, the speed meter in this example, when transmissively illuminated, down to the luminance of the lowest luminance area on the board. The criterion number of transferred layers is the number of ink layer $2b$ transfers required for the highest luminance to be made closest to the lowest luminance without going lower (darker) than the lowest luminance. The speed meter is illuminated under the same conditions as if the board was illuminated with point light sources actually used.

Figure 3A:
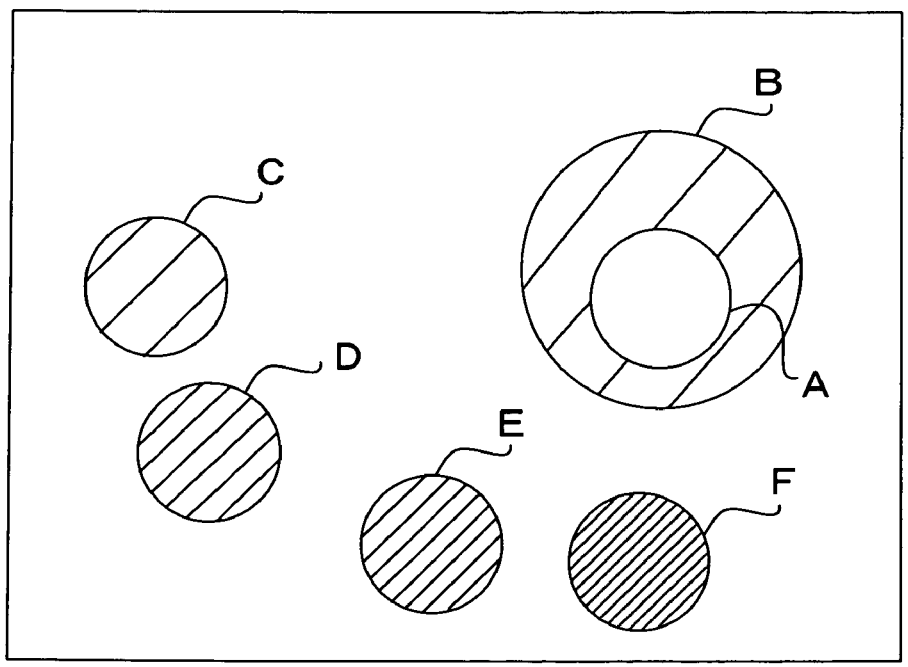
FIG. 3A is a schematic view showing the bright variation in the transmissive board showed in FIG. 1 at the moment of transmissive illumination.

FIG. 3A is a schematic view showing differences in luminance between the different areas on the speed meter 1 when the speed meter is illuminated. As the density of stripes in an area is lower, the luminance of the area is higher. Accordingly, in FIG. 3A, the highest luminance area is the area A, and the lowest luminance area is the area F. Hereinafter, the area A is sometimes referred as the highest luminance area A, and the area F is sometimes referred as the lowest luminance area F.

Figure 3B:
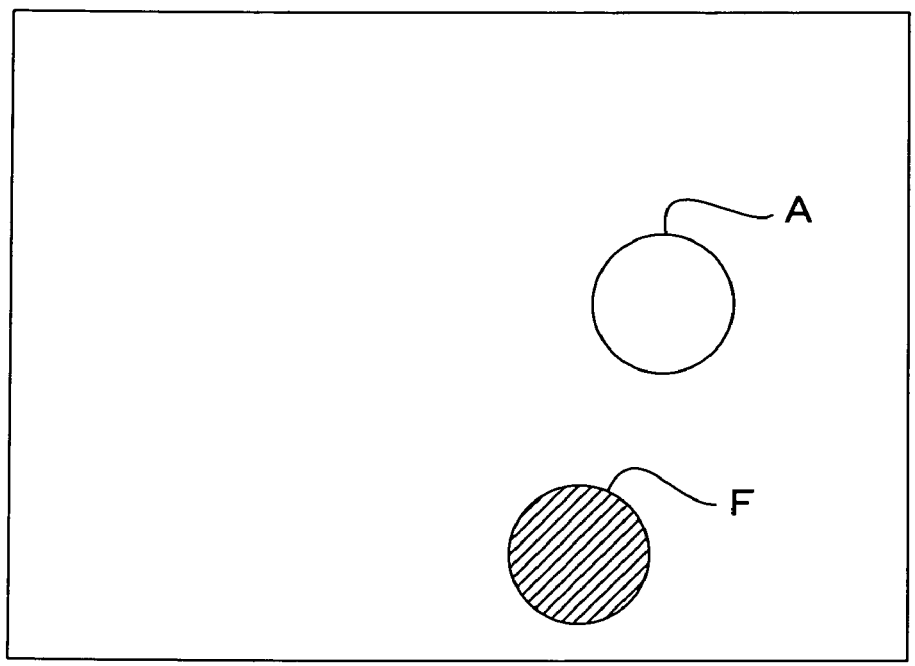
FIG. 3B is a view showing a state of shielding light to the area except for the highest luminance area and the lowest luminance area.

In order to adjust the luminance of the highest luminance area A to that of the lowest luminance area F, FIG. 3B shows that a shading-typed thermal transfer sheet (for example, black ink) is printed to portions corresponding to the areas B-E on the shading-typed base material. Thereby, the areas B-E without the highest luminance area A and the lowest luminance area F are shaded. Using the rough control step, under the state shown in FIG. 3B, the ink layer $2b$ of the thermal transfer ink sheet for controlling luminance is transferred to a TIA corresponding to the highest luminance area A on the shading-typed base material repeatedly from 1 to 5 times in order to bring the luminance of area A closer to the luminance of area F. The luminance of the highest luminance area A is checked for each time. The number of transfers that accomplish this step of shifting the luminance of area A closer to that of area F (lowest luminance) by transfers should be specified. This number of transfers determined by the rough control step is set as the "criterion number" of transferred layers.

Next, the method of determining the "criterion area-ratio" will be described. The criterion area-ratio is the area-ratio used when the minor ink volume, which can not be controlled by the above transfer, is controlled by minor-control transfer in order to make the luminance of the highest luminance area A most closely reflect the luminance of the lowest luminance area F. First, similar to obtaining the criterion number of transferred layers, the area B-E are shaded, but not the highest luminance area A and the lowest luminance area F, and the ink layer $2b$ is transferred to the portion corresponding to the highest luminance area A up to the criterion number of transferred layers, as described above. After that, a minor-control adjustment takes place wherein a percentage of the ink layer $2b$ is transferred to the portion corresponding to the highest luminance area A to achieve the "criterion area ratio". In each case, the luminance of the highest luminance is checked. The area-ratio 0% means the case where no ink layer $2b$ is transferred, and the area-ratio 100% means the case where the ink layer $2b$ is transferred as it is, a whole or entire ink transfer.

When determining the criterion area-ratio during the minor control step to control the luminance of area A to more accurately reflect the luminance of area F (the lowest luminance), it does not matter whether the luminance of the highest luminance area A is higher or lower than the luminance of the lowest luminance area F.

The "maximum number of transferred layers" is then established. The sum of the "criterion number" of transferred layers and the "criterion area-ratio" obtained by the above described method is the maximum ink volume, and hereinafter referred as "the maximum number of transferred layers". For example, the maximum number of transferred layers in the case where the criterion number of transferred layers is 3 and the criterion area-ratio is 30%, is 3+0.3=3.3. In other words, it takes 3.3 volumes of an entire ink layer to reduce the TIA with the highest luminance to that of the TIA with the lowest luminance. In this example, the method for equalizing the luminances of the speed meter 1 in the case where the maximum number of transferred layers is 3 will be described.

After the maximum number of transferred layers are obtained, the front of the speed meter 1 at the moment of transmissive illumination is photographed by a digital camera to obtain a luminance distribution image data (hereinafter referred as "the image data" only) which is the digital data of photographed image. The speed meter 1 should be photographed under the conditions where the luminance of the highest luminance area A is not higher than the highest luminance of the digital process so that the photographed image is obtained without white effect. For example, if the photographed image is treated as a 256-color grayscale image data, the "tone value" of the highest luminance area A of the photographed image data should be set to 255. Tone value can be referred to as brightness.

Figure 4A:
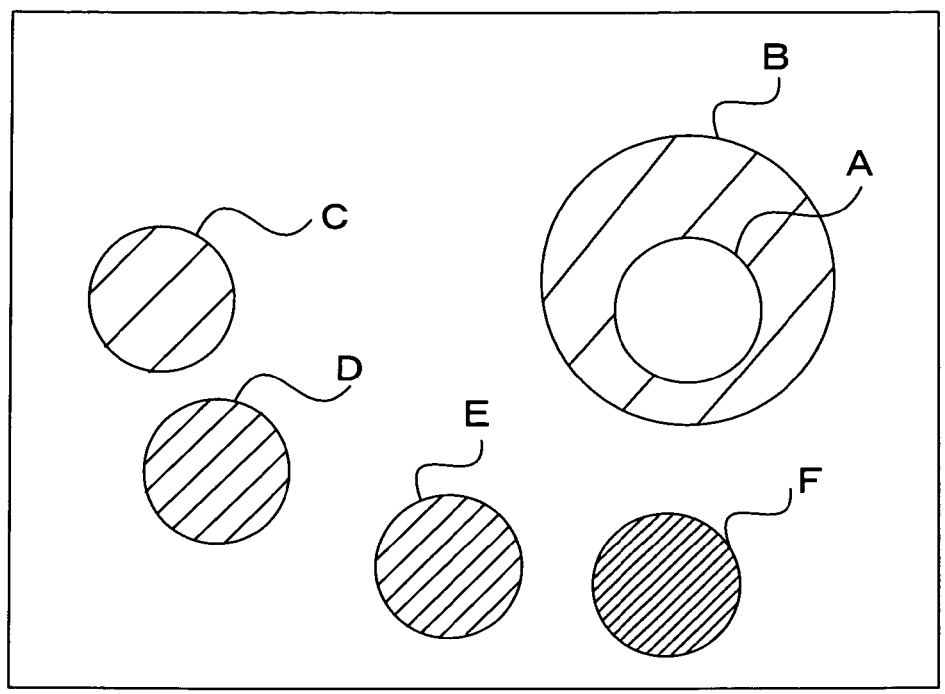
FIG. 4A is a view showing image data of the transmissive board showed in FIG. 1 at the moment of transmissive illumination.
Figure 4B:
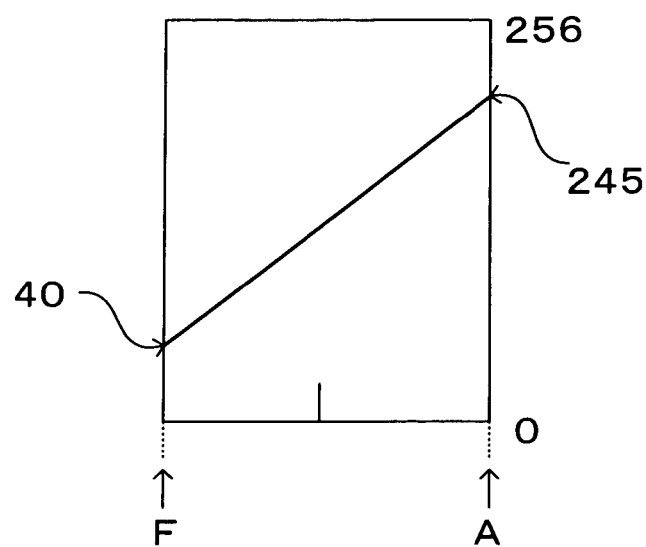
FIG. 4B is a view showing a tone curve of the transmissive board at the moment of transmissive illumination.

FIG. 4A and FIG. 4B show the state of the image data and the tone curve of the image data in the case where the image photographed under the above conditions is the 256-color grayscale image data. The tone value, corresponding to a number between 0 and 255 of the image data, of each of areas A-F is obtained from the image data shown in FIG. 4A by implementing digital processes to each of areas A-F. In each of areas A-F, as depicted in FIG. 4A, as the stripe density in the area is higher, the luminance is lower, that is, the tone value is lower. In the present example, the tone value of area A is 245, the tone value of area B and area C is 200, the tone value of area D is 120, the tone value of area E is 70, and the tone value of area E is 40. Although more kinds of tone value are distributed in actual image data, the luminance control only for areas A-F shown in FIG. 4A will be described for convenience sake. The lateral axis of the tone curve shown in FIG. 4B indicates the luminance of the speed meter 1 at the moment of transmissive illumination, the left end of the horizontal, or the X axis, indicates "the lowest luminance" and the right end indicates "the highest luminance". The vertical axis indicates the tone value of image data of the photographed speed meter 1. The bottom of the tone value axis indicates zero and the top indicates 256. The tone value corresponding to the lowest luminance is 40 which is the tone value of the lowest luminance area F, and the tone value corresponding to the highest luminance is 245 which is the tone value of the highest luminance area A.

Figure 5A:
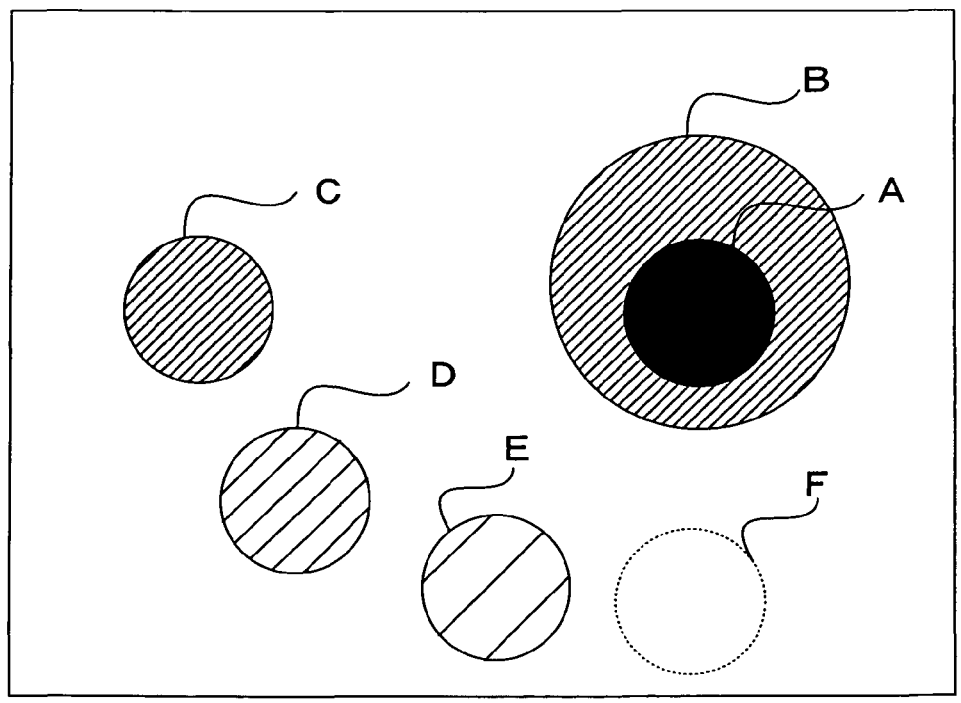
FIG. 5A is a view showing a state of image data showed in FIG. 4A which is provided a reversal process and the tone value of which is controlled to range from zero to 256.
Figure 5B:
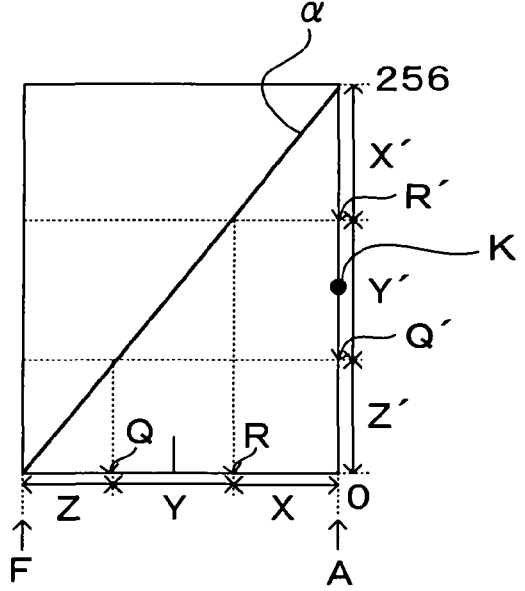
FIG. 5B is a view showing a tone curve corresponding to FIG. 5A.

Next, the tone curve shown in FIG. 4B is controlled so that the tone value of the highest luminance area A is set to the maximum tone value 256 and the tone value of the lowest luminance area F is set to the tone value zero in the present invention. The result of the control is shown in FIG. 5A and FIG. 5B. FIG. 5A shows the state of implementing the above described control to tone-convert the image data shown in FIG. 4A. The highest luminance area A is shown as a state representing the tone value 256, the lowest luminance area F is shown as a state representing the tone value zero. As shown in FIG. 5A, where the density of the stripes in an area is higher, the ink volume to be printed in that area is more. FIG. 5B shows the tone curve a relating each luminance of the image data shown in FIG. 5A to each tone value. As the tone curve a shows, the tone value ranging from zero to 256 distributes widely at this moment. However, by the method described later, all of the tone values can be made the tone value zero in the tone curve α. Namely, the tone values of all areas can be equalized to the luminance of the lowest luminance area F, as described in detail below.

Hereinafter, the tone value corresponding to area A is referred as the tone value A-F, and the luminance corresponding to the areas A-F before being controlled is referred as the luminance A-F. To equalize the luminance on the board, the luminance level (across the horizontal luminance axis) is divided based on the maximum number of transferred layers that has already been calculated. The number of divisions is equal to the number of printing thermal transfer ink sheets for controlling luminance which is necessary to lower the highest luminance A to the lowest luminance F. As above described, the number of printings is the minimum integer not lower than the maximum number of transferred layers. For example, in the case where the "maximum number of transferred layers" is 2.2, the luminance level is divided by the number is 3. This is because, where the maximum number of transferred layers is 2.2, one transfer of ink is performed at 100% ink volume, a second transfer of ink is performed at 100% ink volume, and a third transfer of ink is performed at 20% ink volume, as determined by the minor control step. As the maximum number of transferred layers is 3.0 in the present embodiment, as shown in FIG. 5B, the luminance level across the luminance axis (horizontal) is divided into 3 equal levels, that is, x, y, and z.

The width of the divided luminance levels X-Z will be described. Each width of the luminance level for an integer part corresponds to the maximum ink volume. Each width of luminance level for a decimal part corresponds to a minor ink volume with respect to the area A.

For example, in a case where the maximum number of transferred layers is 2.2, the division number of luminance level is 3, and the ratio of the widths of each of the luminance levels is 1:1:0.2. However, in this example, because the maximum number of transferred layers is 3.0, as showed in FIG. 5B, the width of the luminance levels X-Z is equally divided into 3. Hereinafter, each of the luminance levels from the higher luminance level is called the high luminance level X, the middle luminance level Y, and the low luminance level Z. Each of the luminance levels corresponds to a high tone value area X', a middle tone value area Y', and a low tone value area Z' by a tone curve α. Each of the luminance levels X-Z and each of the tone value areas X'-Z' is the maximum ink volume in this example. The minimum luminance level of the middle luminance level Y is denoted "Q", and the minimum luminance of the high luminance level X is denoted "R". The tone value corresponding to the each luminance of areas Q and R is "Q'" and "R'".

In order to equalize the luminance A-E to the minimum luminance F, all tone values included in the tone value areas X'-Z' should be made to the tone value zero of the tone curve α. In other words, the goal is to make the tone values of the areas A-E zero. The method for making the tone values zero is by the transfer and the minor-control transfer of the ink layer 2b. Each of the tone value areas X'-Z' is the maximum ink volume. Accordingly, by transferring the ink layer 2b, the tone value Q' one time is made to be the tone value zero, the tone value R' is made to be the tone value Q', and the tone value 256 is made to be the tone value R'.

Moreover, for example, in the case where the tone value K, which is not the border value of each tone value area X'-Z', is made to be the tone value zero, as the maximum ink volume is from the tone value Q' to the tone value zero, the ink layer 2b should be transferred one time, and the minor-control transfer should be implemented in accordance with the area-ratio to make the luminance difference, which is the minor control width from the tone value K to the tone value Q', to the tone value zero. In this embodiment, the area-ratio for making the minor ink volume of each tone value zero (herein after referred to as "necessary area-ratio") is equal to the ratio of the minor ink volume to be controlled to the maximum ink volume. Such ratio of the width is constant for each tone value. Consequently, the necessary area-ratio is always constant to each tone value. Therefore, each tone value can be corresponded to the necessary area-ratio in advance. Accordingly, such correspondence relations can be set as a table in advance, and the necessary area-ratio can be obtained from the tone value by referring the table.

Figure 6A:
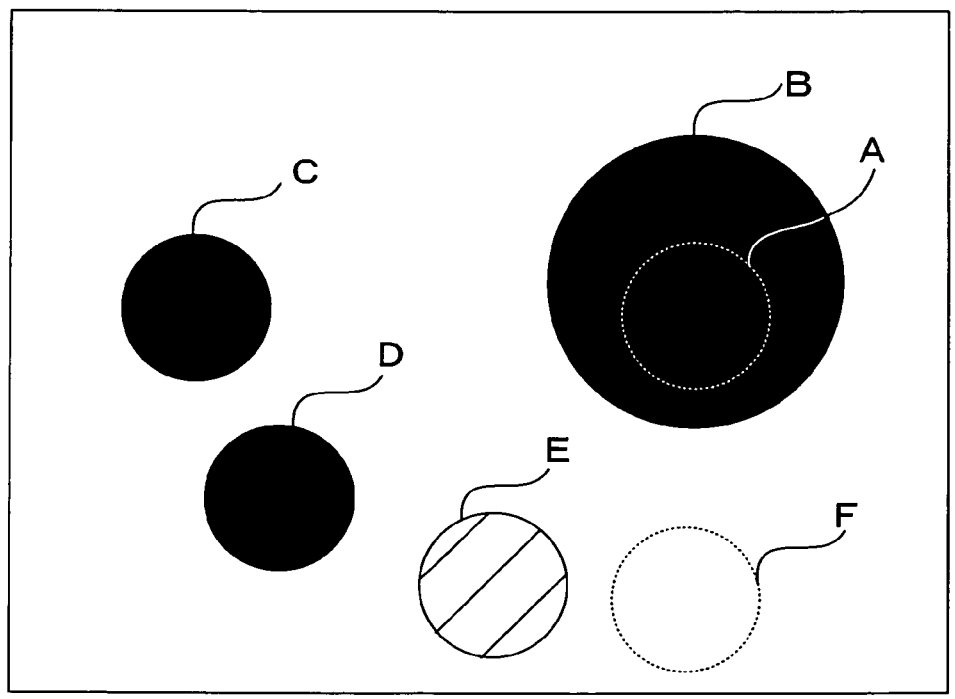
FIG. 6A is a view showing the image data showed in FIG. 5A, in which a tone conversion is implemented for a low luminance level.
Figure 6B:
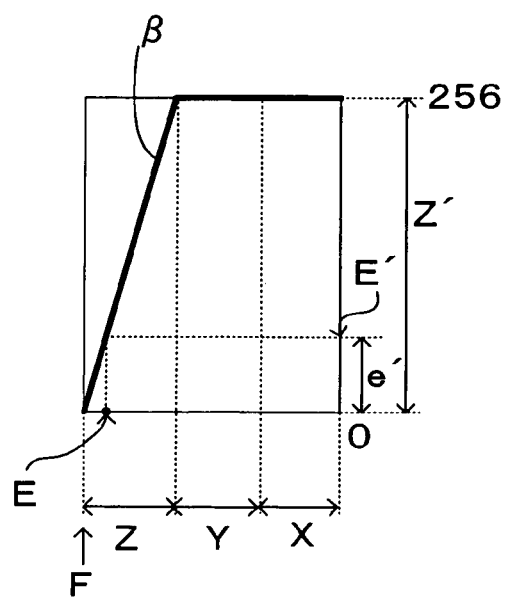
FIG. 6B is a view showing a tone curve corresponding to FIG. 6A

In this example, each of the tone value areas x'-Z' is controlled independently. First, the processing for low tone value area Z' will be described and is depicted in FIGS. 6A and 6B. The low tone value area Z' is divided into 256 tones and all of the tone values included in the middle luminance level Y and the high luminance level X are made 256.

Image data, where the low tone value area Z' is controlled by the tone curve α, is showed in FIG. 6A and the tone curve 13 of the result of control is showed in FIG. 6B. All of the tone values of areas A-D without areas E and F belonging to the low luminance level Z are 256, and the tone value of area E is E'. As is shown in FIG. 5B, the tone value zero corresponds to the luminance of the area F which is the "criterion luminance", and Z' is the maximum ink volume Z. The e' in FIG. 6B, between the tone values from zero to E', is the minor ink volume about the luminance E. In the processing about the low tone value area Z', the ink layer 2b should be transferred or minor-control transferred so that all of the tone values of areas A-F indicated by the tone curve β are made zero. Accordingly, there is no need to do anything about the minimum luminance area F, or about the areas A-D the tone value of which is 256 wherein the ink layer 2b should be transferred by the area-ratio 100%. About area E, however, the necessary area-ratio corresponding to the tone value E' should be obtained from the above described calculation and the ink layer 2b should be minor-control transferred with the necessary area-ratio.

Figure 7A:
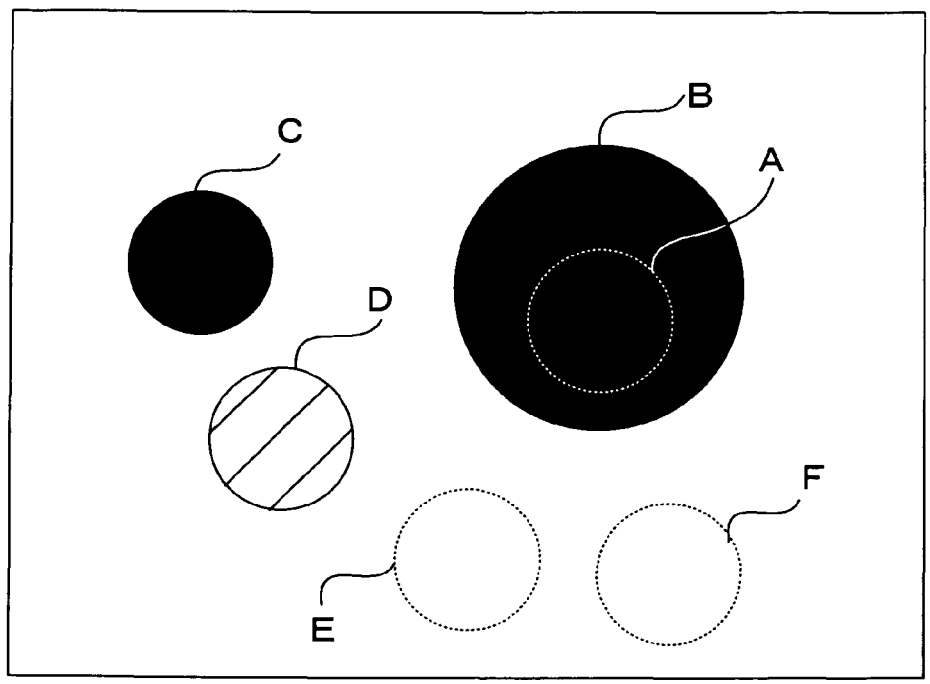
FIG. 7A is a view showing the image data showed in FIG. 5A, in which a tone conversion is implemented for a middle luminance level.
Figure 7B:
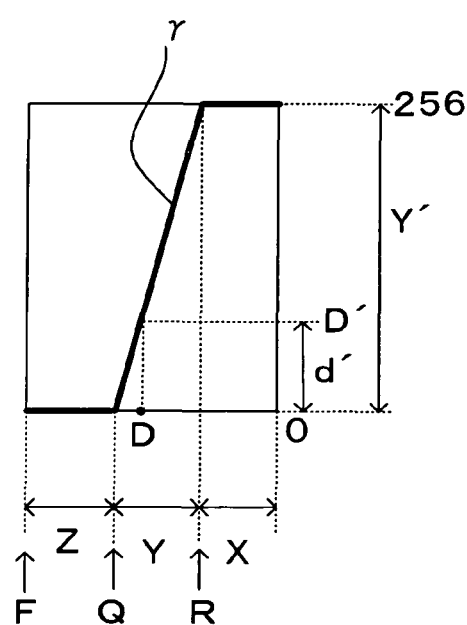
FIG. 7B is a view showing a tone curve corresponding to FIG. 7A.

Next, the processing for the middle tone value area Y' will be described. First, the tone curve a in FIG. 5B should be controlled so that the tone values not over the minimum tone value Q' in the middle tone value area Y' are brought to zero and the tone values over the maximum tone value R' are brought to 256. Turning to FIG. 7B, as a result, the middle tone value Y' is divided into 256 tone values. All of the tone values corresponding to the low luminance level Z are brought to zero and all of the tone values corresponding to the high luminance level X are brought to 256. About the middle tone value area Y', the image data representing the result of controlling the tone curve α is showed in FIG. 7A. The tone curve y as the result of control and is showed in FIG. 7B. The tone value of areas E and F included in the low luminance level Z is zero, the tone value of areas A, B, C included in the high luminance level X is 256, and the tone value of area D included in the middle luminance level Y is D'.

The luminance level zero corresponds to the luminance level of area Q as the criterion luminance, Y' is the maximum ink volume, the tone values d' from zero to D' is the minor ink volume control about the luminance D. Therefore, in the processing about the middle tone value area Y', the ink layer 2b should be transferred or minor-control transferred so that all of the tone values of areas A-F indicated by the tone curve y are made zero. Accordingly, in the similar way to the low luminance level Z, the ink layer 2b should be transferred by the transfer area-ratio 100% about areas A-C the tone value of which is 256. About areas E and F the tone value of which is zero, the transfer is not needed. However, about area D, the necessary area-ratio corresponding to the tone value D' should be obtained from the above described calculation and the ink layer 2b should be transferred with the necessary area-ratio.

Figure 8:
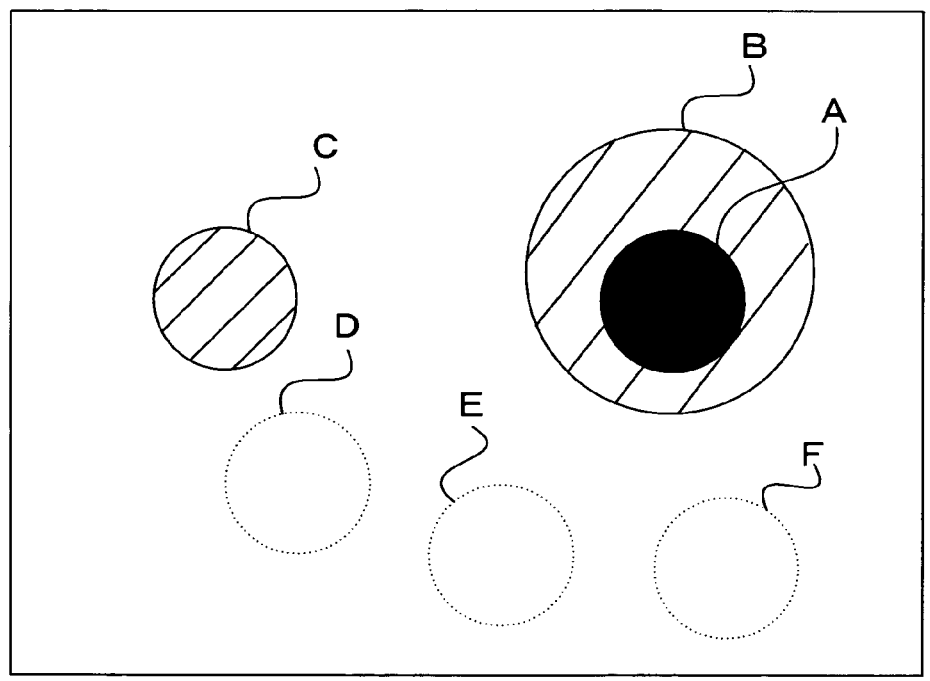
FIG. 8 is a view showing the image data showed in FIG. 5A, in which a tone conversion is implemented for a high luminance level.
Figure 9:
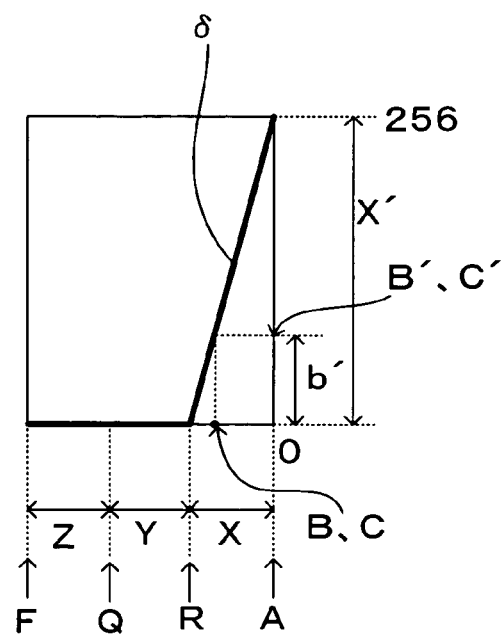
FIG. 9 is a view showing a tone curve corresponding to FIG. 8.

Next, the processing for the high tone value area X' will be described. First, the tone curve a in FIG. 5B should be controlled so that the maximum tone value in the high tone value area X remains to be 256 and all of the tone values not over the minimum tone value R' are brought to zero. As the result and as depicted in FIG. 9, the high tone value area X' is divided into 256, all of the tone values corresponding to the middle luminance level and the low luminance level is brought to zero. Image data representing the result of control the tone curve a about the high tone value area X' is showed in FIG. 8. The tone curve 6 obtained by the result of control is showed in FIG. 9. The tone value of the areas E and F in the low luminance level Z and the tone value of the area D in the middle luminance level Y is zero. Each of the tone values of areas B and C in the high luminance level X is B' and C' respectively.

The tone value zero now corresponds to the luminance of area R as the criterion luminance. X' is the maximum ink volume control, the tone values b' from zero to B' is the minor ink volume control about the luminance B. In the processing about the high tone value area X', the ink layer 2b should be transferred or minor-control transferred so that all of the tone values of areas A-F indicated by the tone value α are brought to zero. Accordingly, in the similar way to the low luminance level Z and the middle luminance level X, about the area A the tone value of which is 256, the ink layer 2b should be transferred by the transfer area-ratio 100%, and the transfer of layer 2b is not needed about areas D-F the tone value of which is zero. About area B, the necessary area-ratio corresponding to the tone value B' should be obtained and the ink layer 2b should be minor-control transferred by the necessary area-ratio. Also, the similar processing to the area B should be implemented about the area C.

In the above described processing, the tone values of areas A-E are brought to the minimum luminance in each of the tone value areas X'-Z' for each of the tone value areas X'-Z'. Accordingly, when processing for all tone value areas X'-Z' ends, the luminances A-E as the control object is brought to the tone value zero corresponding to the minimum luminance F. Namely, all of the luminances A-E can be brought to the minimum luminance F equally. In the case of the present example, by the above described processing, the ink layer 2b is transferred three times about the area A finally, about areas B and C the ink layer 2b is transferred two times and minor-control transferred with the obtained necessary area-ratio one time, about area D the ink layer 2b is transferred one time and minor-control transferred with the obtained necessary area-ratio, and about area E the ink layer 2b is minor-control transferred with the obtained necessary area-ratio only. Thereby, the luminance of each area A-E can be equal to be the luminance of area F.

Figure 10A:
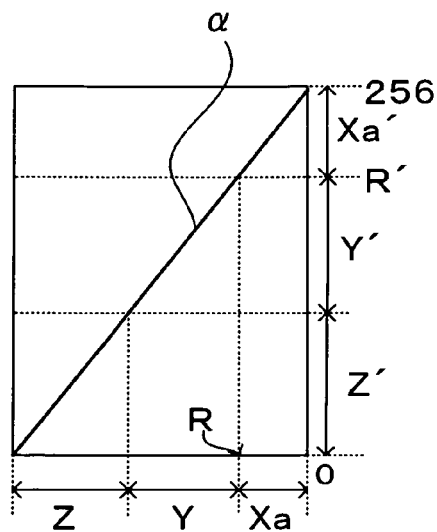
FIG. 10A is a view showing an example of division of the luminance levels of the tone curve showed in FIG. 5B in the case where the maximum number of transferred layers is 2.5.

The present invention is not limited to the above described embodiment and may be realized in various embodiments. For example, the maximum number of transferred layers may not be an integer and can have the decimal part. For example, the case of 2.5 will be described. In the tone curve a showed in FIG. 5B, the luminance levels should be divided so that the ratio between the width of high luminance level Xa, the width of middle luminance level Y, and the width of low luminance level Z is 0.5:1:1. In the case where the maximum number of transferred layers is 2.5, the tone curve a in the state where the luminance levels has been divided is showed in FIG. 10A. The processing about the middle luminance level Y and the low luminance level Z is similar to the above described processing about the middle luminance level Y and the low luminance level Z respectively. Therefore, the description of the processing is omitted.

Figure 10B:
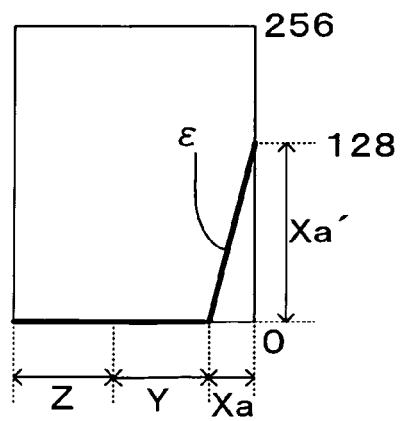
FIG. 10B is a view showing the result of implementing the tone conversion for a high luminance level showed in FIG. 10A.
Figure 10C:
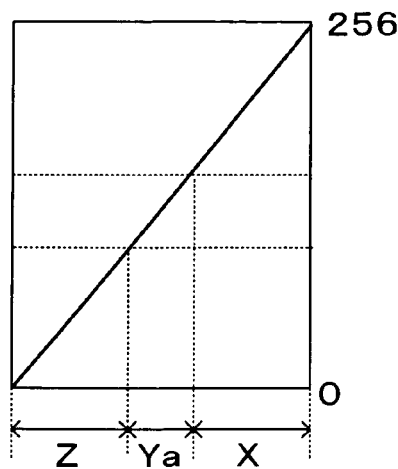
FIG. 10C is a view showing a different example of division of the luminance levels from the example in 10A.

The processing of the high tone value area Xa' corresponding to the high luminance level Xa will, however, be described. The tone curve a shown in FIG. 5B should be controlled so that the maximum tone value in the high tone value area Xa' is made the value "256× criterion area-ratio", and all of the tone values less than the minimum tone value R' are made zero. The result of the control the tone curve ε is showed in FIG. 10B. The tone value corresponding to the low luminance level Z and the middle luminance level Y is zero, the highest value of tone value in the high luminance level Xa is 128 obtained by 256×0.5. The tone values in the high tone value area Xa' are divided into the tone values from zero to 128. In this manner, the maximum tone value of the luminance level Xa corresponding to the decimal part of the maximum number of transferred layers can be obtained by the maximum ink volume×the criterion area-ratio. The part of the curve corresponding to the high luminance level Xa of the tone curve ε is the part corresponding to the criterion area-ratio of the same curve as each of luminance levels Z and Y of the other tone curves β and γ. Accordingly, the necessary are ratio corresponding to each of the tone values in the high tone value area Xa' can be also obtained by the above described table.

Moreover, in the case where the maximum number of transferred layers has the decimal part, it is assumed that the luminance level corresponding to the decimal part is the high luminance level Xa. However, the luminance level corresponding to the decimal part is not needed to be the high luminance level, and may be any level of luminance. For example, in the case where the maximum number of transferred layers is 2.5, the middle luminance level Ya may be set as the luminance level corresponding to the decimal part, and the ratio between the width of the high luminance level X, the width of the middle luminance level Ya, and the width of the low luminance level Z may be set as 1:0.5:1.

Moreover, in the present embodiment, the processing of making the tone value of each luminance level zero from the lower luminance level is described. However, it doesn't matter which order of the processing for the divided luminance levels. For example, the luminance of each tone value may be made the criterion luminance from the higher luminance level. The criterion luminance in the processing for each luminance level is the luminance of the areas F, Q, R corresponding to the minimum luminance of the luminance level X-Z before the processing of luminance control respectively.

In the present embodiment, the method of determining the height of luminance by eye is described. However, by obtaining the digital image data of the front of speed meter 1 at the moment of transmissive illumination, the height of luminance may be determined based on the digital image data. Moreover, as above described, the maximum number of transferred layers is the ink amount required to make the highest luminance the lowest luminance. In the case where such ink amount is determined in advance, it is not necessary to implement the processing for obtaining the maximum number of transferred layers in the present embodiment. Also, in the case where the maximum number transfer layers is obtained by calculation, such as the case where the maximum ink volume and the minor ink volume for the highest luminance are known in advance, it is not necessary to implement the processing for obtaining the maximum number of transferred layers in the present embodiment. Moreover, throughout from the processing of obtaining the maximum number of transferred layers to the processing of transferring the ink layer 2b in accordance with each luminance level, the process can be implemented by a computer. The process after obtaining the maximum number of transferred layers can be implemented by a computer. The transfer number in the method for obtaining the criterion number of transferred layers and each area-ratio in the method for obtaining the criterion area-ratio are limited to the present embodiment and can be changed appropriately.

As the method for controlling the amount of ink layer 2b to be printed to a unit area, the amount is controlled by number of printed dots in the present embodiment. However, it can be controlled by the size of printed dot. Moreover, the criterion area-ratio may be obtained by selecting area-ratios which bring the luminance as the control object close to the target luminance and averaging the selected area-ratios. Moreover, the printing method for realizing the present invention is not limited to a thermal transfer print, as long as the ink having a fixed transmittance can be printed by one-time print and the ink amount to be printed to a unit area can be controlled. For example, ink-jet printing and dot-impact printing can be applied.

In the present example, a method is described wherein all luminances before luminance control processing are equalized to the lowest luminance as the target luminance.

However, different target luminance can be set depending on luminance or position of the processing object. In this case, by different luminance, a predetermined shape or color gradation can be obtained. Moreover, color tone can be controlled by dividing the image data photographed by a digital camera into light's three primary colors, and controlling the luminance corresponding to each color by the luminance control method of the present invention.

Moreover, the maximum tone value is not limited to 256 and can be changed appropriately depending on the type of print system or purpose. The transmissive board is not limited to a speed meter 1 and can be any kind of a board as long as the board is illuminated from the back thereof such as various kinds of boards of instruments. Moreover, as the method for obtaining the area-ratio to bring each tone value to zero, in the present embodiment, the method is employed that the table in which the tone value and the area-ratio are corresponded to each other is prepared in advance. However, in the case where there is a constant relationship between the tone value and the area-ratio, the area-ratio can be obtained, for example, from an equation having a variable as the tone value for obtaining the relationship.

The invention claimed is:

1. A method of adjusting the luminance of a transmissive board having a plurality of transmissively illuminated areas (TIA) wherein the method of adjusting the luminance of the board comprises the steps of:
    illuminating the transmissive board via at least one light source with a substantially constant light transmittance on a front or back side of the board;
    identifying a first TIA that exhibits a lowest luminance from the board and designating the lowest luminance as a target luminance;
    identifying a second TIA that exhibits a control luminance higher than the lowest luminance from the transmissive board and designating the second TIA as a control object;
    providing a plurality of entire ink layers, each entire ink layer reducing the luminance of a TIA by a maximum control luminance value when applied to said TIA, wherein the plurality of entire ink layers is provided either on a plurality of ink sheets or is provided as a plurality of sections on a single ink sheet;
    calculating a criterion number which is an integer number by rounding down a ratio of a difference between the control luminance and the target luminance to the maximum control luminance value to the nearest integer wherein the criterion number provides the number of entire ink layers to be transferred to the control object in order to minimize the difference between the control luminance and the target luminance to a maximum control luminance value;
    calculating a criterion area-ratio by obtaining the fractional component of the ratio of the difference of luminance between the control luminance and the target luminance to the maximum control luminance value;
    reducing the control luminance to the target luminance by transferring the criterion number of said plurality of entire ink layers overlappingly to the control object; and subsequently transferring a fraction of one of said plurality of entire ink layers onto the control object, such that the fraction is equal to the criterion area-ratio, wherein the transferring step is performed by contacting the transmissive board with either the plurality of ink sheets or the single ink sheet to transfer the ink layers to the transmissive board.

* * * * *